T. EVANS.
TIN PAILS.
No. 185,435. Patented Dec. 19, 1876.
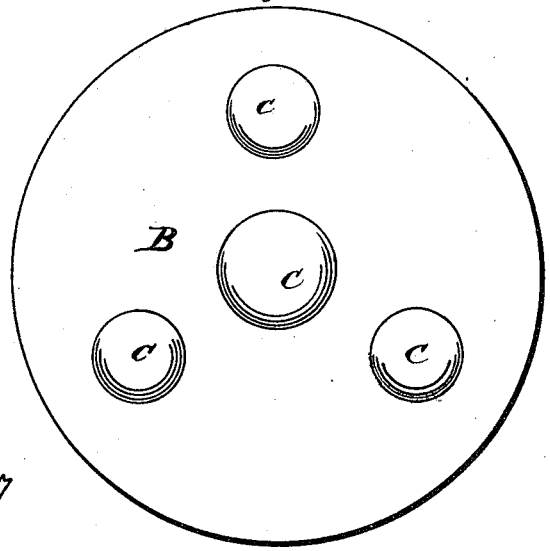
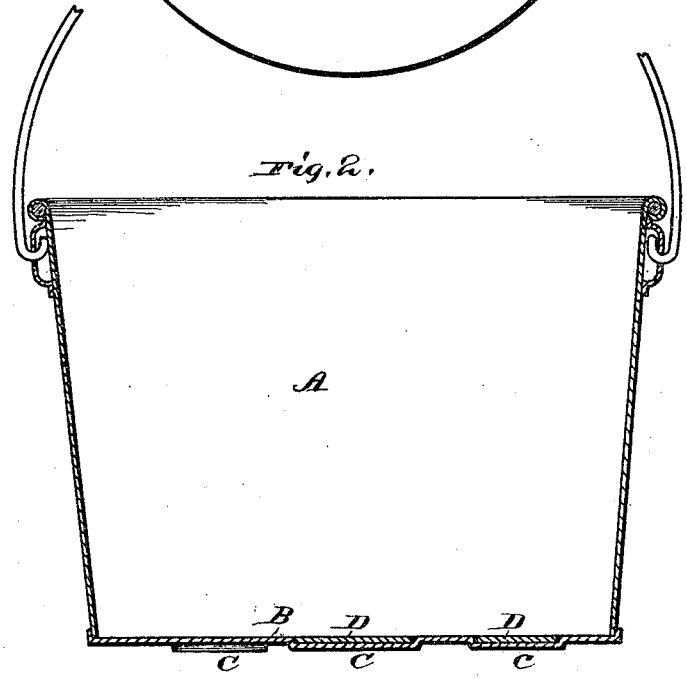
WITNESSES:
Jas. F. Duhamel,
Thomas Byrne.
INVENTOR:
Thos. Evans
PER
H. S. Hot.
ATTORNEY.
THE GRAPHIC CO. N.Y.

UNITED STATES PATENT OFFICE.

THOMAS EVANS, OF BRANCHPORT, NEW YORK.

IMPROVEMENT IN TIN PAILS.

Specification forming part of Letters Patent No. 185,435, dated December 19, 1876; application filed March 29, 1876.

*To all whom it may concern:*

Be it known that I, THOMAS EVANS, of Branchport, in the county of Yates and State of New York, have invented certain new and useful Improvements in Pails, of which the following is a specification:

My invention relates to pails and any other vessels, of any form or description, made of tin and used to contain water; and it consists in providing the bottoms of such vessels with depressions or recesses on the inside, forming projections on the outside, and filling such recesses with zinc, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a bottom view, and Fig. 2 a vertical section, of a tin water-pail embodying my invention.

A represents the body, and B the bottom, of a tin water-pail, constructed in any of the known and usual ways. In the bottom B, from the inside, are made a number of recesses or depressions, which form corresponding projections C on the outside. These recesses and projections may be of any size and form desired, and of any number, according to the size of the vessel. These recesses are filled with plates of zinc D, fitting therein and soldered thereto, so as to present a smooth inner surface of the bottom B.

By constant use of the vessel the projections C will wear and cause the vessel to leak, thereby rendering it useless or necessitating a new bottom.

By my invention of filling the recesses with zinc, the projections may wear to the level of the under side of the bottom of the vessel without causing it to leak, and thereby producing a bottom that will stand long and constant use; and the chemical action of the zinc, in connection with the tin, is such as to prevent rusting.

This invention is applicable to any and all tin vessels, of any nature or description, that are to be used in or contain water.

Having thus fully described my invention, what I claim as new, and desire to secure by Letters Patent, is—

A tin vessel, A, having its bottom B provided with interior depressions or recesses C, filled with zinc plates D, closely soldered therein, substantially as and for the purposes herein set forth.

In testimony that I claim the foregoing as my own I affix my signature in presence of two witnesses.

THOS. EVANS.

Witnesses:
GEO. W. SHULL,
PETER H. BITLEY.